June 29, 1943.  W. L. HANSEN ET AL  2,323,035
SYNCHRONOUS MOTOR
Filed May 9, 1941
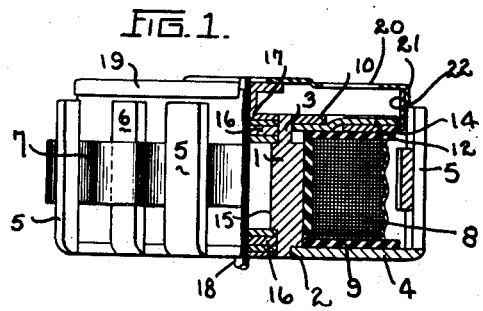
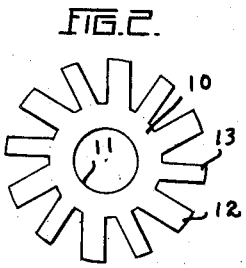
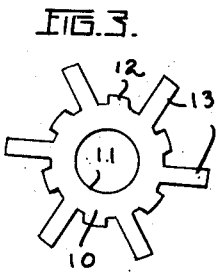
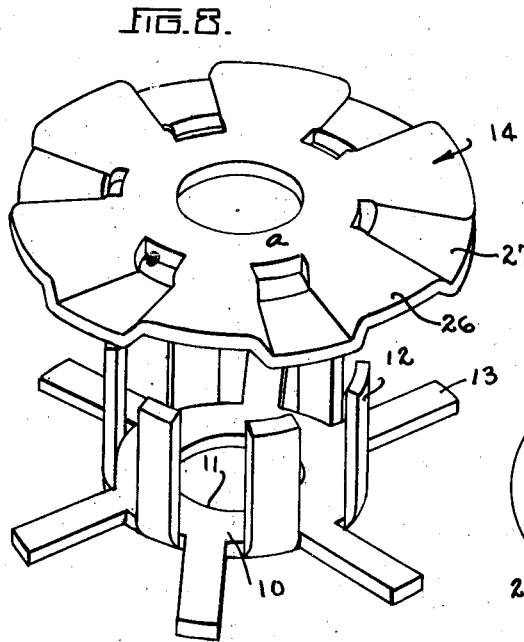
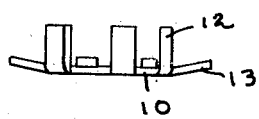
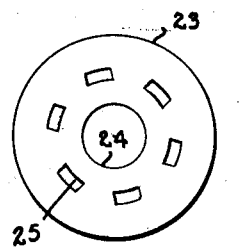
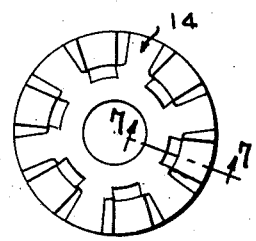
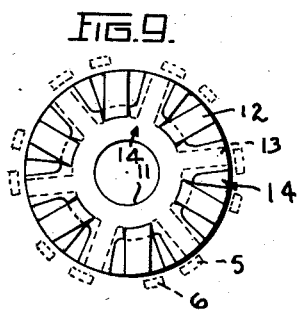
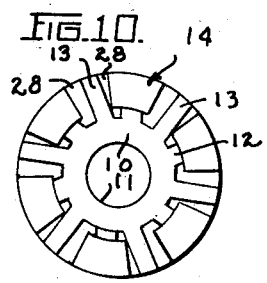
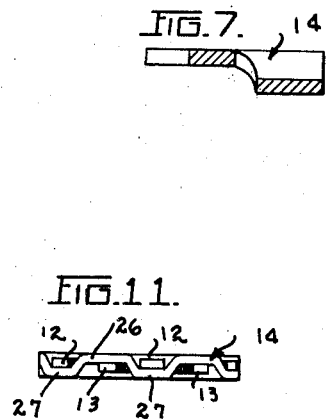
Inventor
WILLIAM L. HANSEN,
IRA N. HURST
by Toulmin & Toulmin
Attorneys Patented June 29, 1943

2,323,035

UNITED STATES PATENT OFFICE 2,323,035

SYNCHRONOUS MOTOR

William Lester Hansen and Ira N. Hurst, Princeton, Ind., assignors to Hansen Mfg. Company, Inc., Princeton, Ind., a corporation of Indiana Application May 9, 1941, Serial No. 392,702

3 Claims. (Cl. 172—278)

This invention relates to electric motors, and in particular to electrical synchronous motors such as are employed for operating clocks.

The invention represents an improvement on the motor structure shown and described in our application Ser. No. 331,610, filed April 25, 1940, assigned to the same assignee as the present invention. The said application discloses a slow-speed synchronous motor in which the magnetic circuit is formed of a plurality of laterally extending pole pieces, the tips of which are spaced away from a plurality of radially extending pole pieces, these pole pieces being taken from opposite sides of the energizing coil. A rotor is arranged to rotate within the annular space formed between the pole tips of opposite polarity. The subject of the present application deals essentially with an improvement on the structure which forms the radially extending pole pieces.

It was pointed out in said application that the pole piece member is constituted of a disc of magnetic material from which the pole pieces extend substantially in a radial direction. In order to place a shading ring in position it is necessary to bend each alternate pole piece upwardly, and after properly positioning the shading ring the bent pole pieces are restored to their original horizontal position, thus in effect causing the shading ring to pass over one pole piece, under the next and over the next, etc., around the entire number of radially extending pole pieces. It is apparent that in such a construction the shading ring cannot be wider than the length of each pole piece because, as stated hereinbefore, the pole pieces which are bent upwardly must pass along the inner periphery of the shading ring, and when restored to their original horizontal position must pass along the upper surface of the shading ring.

It has been found, in practice, that a shading ring in which the width is limited by the length of the radially extending pole pieces may not permit lagging currents to be induced therein of sufficient magnitude to give the rotor a large positive starting torque, and this is particularly true in the case of low frequency exciting currents, for example, 25 cycles per second. The amount of lagging currents which can be induced in the ring is a direct function of the resistance of the ring, which in turn depends, at least in part, on the width of the ring. Consequently, in order to increase these lagging currents from which the starting torque is derived, the shading ring should have the greatest width and thickness consistent with the dimensions and design of the motor as a whole.

The primary object of the present invention is to provide an improved electrical synchronous motor which has relatively high starting and operating torques, particularly at low running speeds.

Another object is to provide an improved pole-piece-shading-ring assembly for synchronous motors.

A still further object is to improve the shading ring element of the motor with a view to obtaining enhanced starting characteristics.

The final object is to provide improved methods of fabricating and assembling certain of the parts of a synchronous motor, particularly the radially-extending pole-piece-shading-ring assembly.

These objects are attained, in brief, by providing a motor structure and design in which a shading ring of disk form, which intertwines the radially extending pole pieces, is given the maximum width in the radial direction. This structure is such that the alternate inner pole pieces are inserted in openings in the shading ring and bringing these inserted pole pieces to the opposite side of the ring from the remaining inner pole pieces.

In the drawing:

Figure 1 is a side elevational view of the motor of this invention, shown partly in cross section and with the casing removed.

Figure 2 is a plan view of the inner pole piece element in flat form as it is stamped from sheet metal.

Figure 3 shows the same element as in Figure 2, but after bending to a preliminary shape.

Figure 4 is an end or edge view of the element shown in Figure 3.

Figure 5 shows the shading ring in flat disk form after being stamped.

Figure 6 illustrates the ring of Figure 5 after a bending operation by which depressions are formed in the shading ring.

Figure 7 is an enlarged section taken along the line 7—7 in Figure 6.

Figure 8 is a perspective view of the finished inner pole piece element and the finished shading ring in position, ready to be assembled.

Figure 9 is a top plan view of the combined inner pole piece element and shading ring assembly, but also showing the positional relationship between the inner or radial pole pieces and the axial pole pieces.

Figure 10 is a bottom plan view of the assembly shown in Figure 9.

Figure 11 is a side or edgewise view of the inner pole pieces and shading ring assembly.

Referring to the drawing in detail, the numeral 1 designates a magnetic tubular hub having reduced diameter portions 2, 3, upon which are mounted the outer and inner field pole assemblies. The outer pole structure consists of a disc 4 having a central opening by which it is mounted on the reduced diameter portion 2 of the hub 1, and having axially directed pole pieces 5, 6 (Figure 9) disposed alternately in a cylindrical path around the hub 1. The pole pieces 5, 6 are preferably not equidistantly spaced about the disc 4 but instead are arranged in pairs around the periphery of the disc, as can best be seen in Figure 9. The alternate pole pieces 5, 6 are shaded by an undulating ring 7 of non-magnetic material such as copper. This undulating ring 7 passes over the outer surfaces of the pole pieces 6 and therefore does not shade them. However, the undulating portions of the shading ring 7 extend around three sides of the pole pieces 5, thereby shading these pole pieces and providing a phase lag when the field structure is magnetized by an alternating flux. The flux is obtained from a coil 8, positioned between the outer and inner field pole assemblies and wound on the tubular hub 1. The coil is insulated from the adjacent metal surfaces by means of layers of insulating material, indicated at 9.

The inner field pole assembly consists of a disc portion 10 having an aperture 11 by which it is mounted on the reduced diameter portion 3 of the hub 1. This disc is provided with pole pieces 12, 13 which extend practically radially from the periphery of the disc 10 and are arranged in pairs around the disc. The pole pieces 12, 13 do not extend as far as the pole pieces 5, 6 but instead are cut short so as to leave an annular space between the tips of the radial pole pieces 12, 13 and the inner peripheral surfaces of the axial pole pieces 5, 6. The width of this annular space is such as to accommodate the thickness of a rotor. It will be noted from Figure 9 that the radial pole pieces 12, 13 are not in line with the axial pole pieces 5, 6 but that the pole piece 6, for example, slightly overlaps the pole piece 12 and similarly the pole piece 5 slightly overlaps the pole piece 13. It has been found that this overlapping arrangement is advantageous from the motor starting and operating standpoints, although it will be understood that if desired any other positional relationship may be provided between the axially and radially extending pole pieces.

The pole pieces 12, which alternate with the pole pieces 13, are shaded by an undulating ring 14 of non-magnetic metal such as copper, this shading ring having undulating portions passing around three sides of each of the pole pieces 12 so as to shade these pole pieces. However, the shading ring 14 merely passes across the front face of each pole piece 13 and therefore does not shade it. As can be seen in Figures 2 and 9, the shaded radial pole pieces 12 are of greater width than the non-shaded radial pole pieces 13, and likewise the shaded axial pole pieces 5 are of greater width than the non-shaded axial pole pieces 6. These disparities of width serve to give the shaded pole pieces greater cross sectional area than the non-shaded pole pieces and therefore to reduce the magnetic reluctance to the passage of the combined shading and useful flux.

The magnetic hub 1 is provided with an axial bore 15, closed at each end by a group of plug washers 16, the uppermost of which forms a support for a grooved thrust bearing member 17. This bearing member, also the washers 16, have a relatively small central opening to receive the shaft 18 of a rotor 19. The rotor may be formed of an aluminum disc provided with openings 20 to cut down its weight and bearing against the upper surface of the thrust element 17. The disc 20 is provided with a peripheral flange 21, to which is secured a cylindrical band 22 of hardened magnetic steel. The rotor band 22 is preferably provided with circumferential spaced incisions (not shown), as many as there are pairs of poles 5, 6, and equidistantly spaced, which incisions serve to interrupt the magnetic path and in this manner to provide pole pieces around the rotor band.

In the fabrication of the improved motor the first step is to apply the undulating ring 7 to the axial pole pieces 5, 6, and then to mount the disc 4 of the axial pole piece assembly on the tubular hub 1, peening the joint to hold the elements together. The coil 8, properly insulated by the layers 9, is then slipped into position about the tubular hub, after which the inner or top pole piece assembly (Figure 1) is mounted on the upper portion of the tubular hub 1. The washers 16 and the thrust bearing member 17 are next placed in position, the space within the opening 15 being supplied with a lubricant in any suitable and well known manner. Finally, the shaft of the rotor is inserted in the central opening, and the entire assembly is ready for mounting within a casing of suitable design.

When an alternating voltage is applied to the end wires of the coil 8, the shading rings 7 and 14 will cause the magnetic flux to lag in those pole pieces which are surrounded on three sides by the respective shading rings. Thus the flux is given a split phase effect, which will cause a magnetic field to rotate around the radially and axially extending pole pieces, carrying with it the rotor. It is evident that the starting torque is directly dependent on the strength of the split phase effect, which in turn, depends on the magnitude of the lagging currents. These effects become notably less as the frequency of the alternating voltage applied to the coil 8 is reduced, so that in a 25-cycle motor, for example, the effectiveness of the split phase must be greater than in the case of a 60-cycle motor if comparable starting torques are to be obtained.

In accordance with the present invention, we propose to increase the lagging currents by reducing the resistance of at least one of the shading rings, and by increasing the area of the shading ring which is subjected to the inducing effects of the magnetic fields. Whereas in the prior form of motor, as disclosed in our earlier application referred to hereinbefore, the shading ring has a width no greater than the length of the radially extending pole pieces, in accordance with the present invention this width has been materially increased until it extends inwardly as far as the tubular hub 1.

Figures 2 to 8 of the drawing show the successive steps taken in the manufacture of the improved shading ring and its radial pole piece accessory. In Figure 2 the inner or radial pole piece element is shown as being in flat form, after having been stamped out of sheet steel of good magnetic properties. It will be noted that every other projection or pole piece 12 has a greater width than the remaining projections or pole pieces 13, for reasons stated hereinbefore. The next step, as shown in Figures 3 and 4, is to bend the wider pole pieces 12 upwardly at positions which coincide with the periphery of the disc 10. The part as thus formed is then placed below the improved shading ring 14, as illustrated in Figure 8.

The successive steps of making the improved shading ring are illustrated in Figures 5, 6 and 7. The first step is to stamp out of sheet copper the circular element 23 shown in Figure 5, provided with a central opening 24 and spaced apertures 25 equidistantly spaced around a circle which corresponds with the periphery of the solid disc portion 10 of the radial pole piece element shown in Figure 2. The shape and area of each aperture 25 are such as snugly to receive the respective pole pieces 12 when they are bent upwardly, as indicated in Figure 4.

The next step, as shown in Figures 6 and 7, consists in giving the ring 23 an undulating shape, and this is preferably done by means of forming dies which depress the metal contained between the openings 25 and the outer periphery of the ring 23. The annular surface of the ring 23 extending inwardly from the periphery of the ring as far as the openings 25 is therefore given an undulating configuration, the humps 26 of which are in line with the inner annular portion of the ring, and the depressions 27 have been pressed downwardly out of line with the remaining portions of the ring. The width of the depressed portions 27 is substantially the same as the width of the openings 25, and from which point they extend preferably in a radial direction, as can be plainly seen in Figure 8. The depth of the depressions 27 is approximately the thickness of the bent-up pole pieces 12.

In assembly, the shading ring 14 is placed over the pole piece element, as shown in Figure 8, the openings 25 being directly above the bent-up pole pieces 12. The shading ring is then pressed downwardly until the bottom surface abuts the upper surface of the pole piece element, causing the pole pieces 12 to enter the openings 25. The upstanding pole pieces are then bent outwardly in any suitable manner so as to lie flat against the upper surfaces of the depressions 27. Thus the shading ring 14 and the pole piece element are securely locked together. The edge view of the assembly is shown in Figure 11, and it will be noted that the depressed portions 27 fit fairly snugly around three sides of the wide pole pieces 12, but the humped or undepressed portions 26 of the ring extend along only one side, i. e., the upper side of the narrow pole pieces 13, thus serving to shade the pole pieces 12 but leaving the remaining pole pieces in an unshaded condition. The considerable space which is left between the undepressed portions of the shading ring and the narrow pole pieces 13 is also clearly indicated in Figure 10 by the presence of the spaces 28.

It is apparent that by providing a shading ring having a dimension which extends in the radial direction from the tips of the radial pole pieces as far inwardly as the reduced diameter portion 3 of the hub 1, a considerably greater cross sectional area is provided than in the prior motors, in which the ring extended inwardly only as far as the outer periphery of the solid disc portion 10 (Figure 2). The portion of the shading ring which has provided this increase in cross sectional area, by reason of the improved construction, is indicated in Figure 8 by the letter a. The volume of metal in the shading ring is therefore increased to such an extent that the resistance offered to eddy currents is materially reduced, thus giving a greater lagging effect to the magnetic fields which traverse the pole pieces 12.

The combined shading ring pole piece assembly is readily secured in place on the tubular hub 1 by peening the joint around the opening 24 in the same manner as the lower field pole assembly. If still greater starting and operating torques are desired, especially at low frequencies of the exciting current, the shading ring 7 can also be made wider, although we have found that this is unnecessary when a shading ring 14, which cooperates with the radial pole pieces, is employed.

While we have described our improved shading ring-inner pole piece assembly in connection with a motor in which the inner pole pieces stop short of the outer axial pole pieces to leave an annular space in which the rotor turns, it will be understood that if desired the improved assembly can be employed equally well in those motors in which the rotor is positioned outside of the axial pole pieces. In such case it would be necessary only to extend the pole pieces 12, 13 (Figure 2) to a length sufficient to coincide with the outer surfaces of the axial pole pieces 5, 6. Furthermore, it may be desirable and entirely feasible, in case the exciting voltage applied to the coil 8 is of standard 60 cycles, to eliminate the shading ring 7 which intertwines the axial pole pieces. It will be understood that the increased lagging current effects obtainable by the improved shading ring 14 may be sufficient to provide the necessary split phase for starting and operating the rotor although, in general, we would prefer to utilize the additional shading ring 7 for this purpose.

It will be understood that we desire to comprehend within our invention such modifications as come within the scope of the claims and the invention.

Having thus fully described our invention, what we claim as new and desire to secure by Letters Patent is:

1. In a synchronous motor, a magnetic core, a magnetic field member mounted on one end of said core and having outer pole pieces disposed axially in a substantially cylindrical path, a second magnetic field member mounted on the other end of the core and having inner pole pieces disposed radially and extending in the general direction of the axial pole pieces, a shading ring of disk form extending inwardly from the outer tips of the inner pole pieces in a diametral direction towards the core, and having openings through which alternate pole pieces pass, said ring having its outer marginal portions intertwining said inner pole pieces, and a rotor cooperating with said magnetic field member.

2. In the art of fabricating inner pole piece shading ring assemblies for synchronous motors, the step of perforating the shading disk at positions in line with the alternate radial spokes of a disk constituting pole pieces of an inner pole piece member, then bending the periphery of the shading disk to form depressions in radial alignment with the perforations, then inserting alternate inner pole pieces into said perforations, and bending the inserted pole pieces into the depressions of the shading ring and in line with the remaining inner pole pieces to form a complete inner pole piece shading ring assembly.

3. In a synchronous motor, in which a magnetic core, and a magnetic field member are mounted on one end of said core and having outer pole pieces disposed axially in a substantially cylindrical path, said pole pieces being arranged in pairs, and a second magnetic field member is mounted on the other end of said core and having inner pole pieces disposed radially with their tips spaced from the tips of the axial pole pieces to leave a continuous annular opening between the pole tips, and a rotor is positioned within said annular opening, means for producing a rotating magnetic field in said field members, said means comprising a copper disc mounted on said core adjacent said second magnetic field member and being provided with an undulating edge portion which extends over only a part of the width of the disc, said undulating edge portion being adapted to intertwine the inner pole pieces in such a manner as to provide a lag between the flux in alternate inner pole pieces with respect to the flux in the remaining inner pole pieces.

WILLIAM LESTER HANSEN.
IRA N. HURST.